US012493641B2

(12) United States Patent
Liu et al.

(10) Patent No.: US 12,493,641 B2
(45) Date of Patent: Dec. 9, 2025

(54) AUTOMATIC DOCUMENT CLASSIFICATION

(71) Applicant: Text IQ, Inc., New York, NY (US)

(72) Inventors: Xiao Liu, New Haven, CT (US);
Jasneet Singh Sabharwal, Vancouver (CA); Apoorv Agarwal, New York, NY (US); Ethan Benjamin, New York, NY (US); Xing Zeng, Vancouver (CA)

(73) Assignee: Text IQ, Inc., New York, NY (US)

( * ) Notice: Subject to any disclaimer, the term of this patent is extended or adjusted under 35 U.S.C. 154(b) by 337 days.

(21) Appl. No.: 17/457,904

(22) Filed: Dec. 6, 2021

(65) Prior Publication Data

US 2022/0179894 A1 Jun. 9, 2022

Related U.S. Application Data

(60) Provisional application No. 63/121,610, filed on Dec. 4, 2020.

(51) Int. Cl.
*G06F 16/35* (2025.01)
(52) U.S. Cl.
CPC ................... *G06F 16/35* (2019.01)
(58) Field of Classification Search
None
See application file for complete search history.

(56) References Cited

U.S. PATENT DOCUMENTS

| | | | | |
|---|---|---|---|---|
| 9,262,395 | B1* | 2/2016 | Zhang | G06F 16/3344 |
| 2003/0033288 | A1* | 2/2003 | Shanahan | G06F 16/3344 |
| 2004/0064438 | A1* | 4/2004 | Kostoff | G06F 16/35 |
| 2005/0010600 | A1* | 1/2005 | Ciaramitaro | G06F 16/93 |
| 2006/0259481 | A1* | 11/2006 | Handley | G06F 40/30 |
| | | | | 707/999.005 |
| 2013/0159305 | A1* | 6/2013 | Starks | G06F 16/35 |
| | | | | 707/E17.089 |
| 2019/0179843 | A1* | 6/2019 | Simard | G06N 99/00 |
| 2021/0383070 | A1* | 12/2021 | Hunter | G06N 20/00 |
| 2023/0026321 | A1* | 1/2023 | Momo | G06F 40/30 |

* cited by examiner

*Primary Examiner* — Loan T Nguyen
(74) *Attorney, Agent, or Firm* — Maschoff Brennan

(57) ABSTRACT

A method may include obtaining a set of documents. Text objects from a text object database generated based on the set of documents may be compared to a search term object to identify relevant text objects that match the search term object. A context object for each of the relevant text objects that indicate usage of the relevant text objects within the documents corresponding to the relevant text objects may be determined, and context objects may be grouped according to similarities between the context objects. A first or second classification may be applied to each context object based on one or more criteria, and the first and second classifications may also be applied to each group based on the classifications of the context objects within the groups. Documents within the set of documents may be given the first or second classifications based on relations and similarities to the classified groups.

20 Claims, 7 Drawing Sheets

AUTOMATIC DOCUMENT CLASSIFICATION

CROSS-REFERENCE TO RELATED APPLICATIONS

This application claims the benefit of U.S. Patent Application Ser. No. 63/121,610, filed on Dec. 4, 2020; the disclosure of which is incorporated herein by reference in its entirety.

TECHNICAL FIELD

The disclosed subject matter relates to automatic document classification.

BACKGROUND

A computing system may be configured to categorize documents according to multiple different classifications based on characteristics of the documents being categorized. Classifications may be applied to the documents according to the words included in each of the documents. The documents may also be classified according to file characteristics associated with the documents or metadata corresponding to the documents.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method of automatically classifying documents may include obtaining a set of documents from one or more document data storages. The method may include generating a search term object based on a search term relating to text included in one or more documents included in the set of documents. The method may also include extracting text objects from each of the documents included in the set of documents in which each of the text objects is a word, a phrase, or a numerical symbol included in each of the documents included in the set of documents. The method may include generating a text object database that includes the text objects extracted from the documents. The text objects may each include an indication of the document from which the text objects are extracted. Each of the text objects from the text object database may be compared to the search term object to identify one or more relevant text objects that match the search term object. The method may additionally include determining a context object for each of the relevant text objects in which the context objects indicate a usage of the relevant text objects within the documents corresponding to the relevant text objects and a context object for one of the relevant text objects determined based on accessing and analyzing one or more text objects from the text object database that are located directly adjacent to the one of the relevant text objects in a document that includes the one of the relevant text objects. The method may include grouping the context objects into a plurality of groups according to similarities between the context objects such that context objects with similarities are sorted into a same group. The method may also include applying one of first and second classifications to each of the context objects. The one of the first and second classifications may be applied to one of the context objects based on analyzing the relevant text objects of the one of the context objects with respect to one or more criteria determined based on the obtained set of documents. The method may additionally include applying one of the first and second classifications to each of the plurality of groups in which the one of the first and second classifications are applied to one of the plurality of groups based on the classifications of the context objects within the one of the plurality of groups. Each document of the set of documents may be automatically classified according to one of the first and second classifications with the second classification applied to one of the documents in response to a relevant text object of the one of the documents being associated with a context object that is part of a group of the plurality of groups that has the second classification applied thereto.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1A:
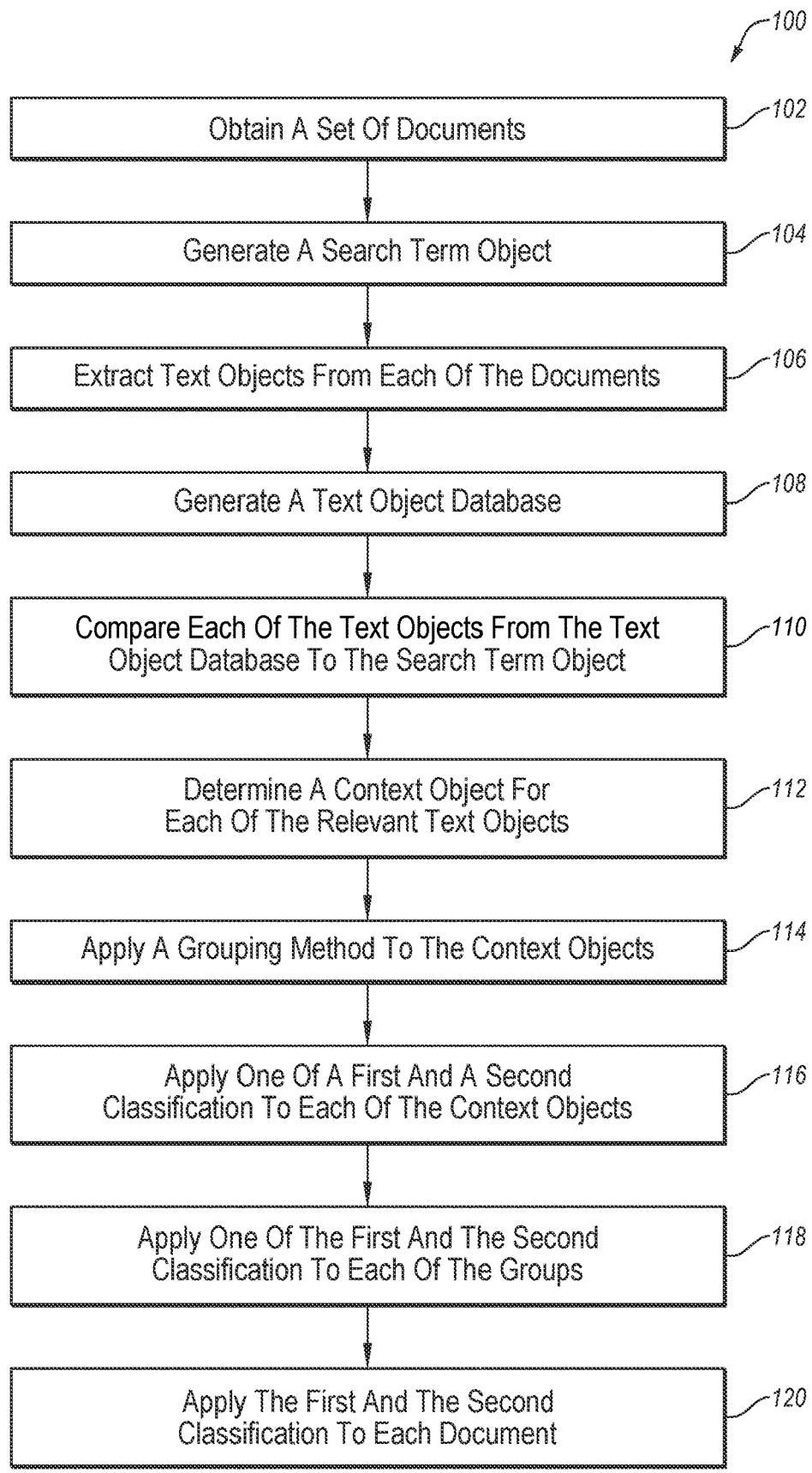
FIG. 1A illustrates an example method of classifying document.

The searching of electronic data for evidence in legal proceedings, often referred to as e-discovery, has become a ubiquitous part of litigation proceedings and legal investigations. Various software may be used utilized to manage electronic documents, communications, and similar information to facilitate search and classification of the electronic data. One facet of the e-discovery process is review of the electronic data for information protected by privilege under attorney-client privilege or attorney work product. It can be important for a party submitting its documents to the opposing side that, to the extent possible, all information protected by privilege is not disclosed to the opposing side, as such disclosure may be construed as waiver of the privilege to some or all privileged information within the produced electronic data.

In a litigation, the e-discovery process commonly requires that the parties collect their data, cull it down using mutually agreed upon search terms (called "responsive review"), and withhold privileged documents (called "privilege review"). The parties in a litigation principally include the plaintiffs and defendants, but may also include third parties that possess relevant documents to the case. To ensure that the parties withhold documents in good faith, the courts require that the parties additionally create and share a privilege log, which specifies the reason that those documents are deemed to be privileged.

Privileged documents may not always be identified by the conventional searching techniques which only involve searching attorneys of a party. One reason this may occur is that the list of attorneys may be incomplete. This limitation restricts the coverage of the search techniques. Another reason is that non-legal employees of the organization may discuss legal advice provided to them by attorneys. While the employees may mention the name of an attorney in the content of the communication, they often do not, for example, copy the attorney on the communication. Since the mentioned attorney is not present in the meta-data fields of the communication, the conventional search may fail to capture these potentially privileged communications.

Privileged information may include not only communications between attorneys and their clients (including employees of the client) regarding legal advice, but also communications between employees of the client discussing the legal advice given to them by the attorney. Attorneys may be both outside counsel and in-house counsel. In organizations, it is common for attorneys to have legal assistants, including paralegals or secretaries, who may convey legal advice on behalf of the attorneys. Even though legal assistants may not be attorneys themselves, their communications may also be considered privileged. Accordingly, there may be many non-attorneys acting on behalf of attorneys who can confer privilege in their communications.

Conventionally, e-discovery is performed by executing searches of the electronic data for topics relating to the litigation or investigation, and perhaps searching for names of attorneys representing a party in the legal proceeding. This process may have several shortcomings. The accuracy of the privilege review may be less than optimal, as keyword and name searches may fail to identify communications that use variants of attorney names or communications that include legal discussion without naming an attorney. In other instances, a user simply may not have known the proper keywords or names to search. Consistency of review may also be a problem, as different reviewers may have different opinions as to whether or not a document is privileged or may employ searches with inconsistent keywords or names. In addition, quality control review may be performed on the results of an e-discovery privilege review, and these quality control processes may identify new keywords or names to be searched. This may lead to a recursive process that is time-consuming and expensive, as each time unsearched terms are found, a new review of the entire electronic data may be necessary.

A document may be more likely to be privileged if it contains certain keywords (e.g., "legal", "lawyer", "settlement"). These privilege-indicating keywords may be called search terms. If a document contains search terms, then it may be more likely that the document also contains privileged information. Whether the occurrence of a search term signals the document containing the term is potentially privileged often depends on the context around the search term. Analyzing the context around search terms may provide information indicative of whether the communication containing the term is potentially privileged.

However, e-discovery may include review of thousands or millions of documents. Consequently, the search terms used to find relevant documents within these thousands or millions of documents may result in a corresponding number of search hits with each search hit having its own context, which may or may not be distinct from the contexts corresponding to other search hits. Initial review of such volumes of documents and a subsequent review of documents related to a particular search term may lead to a time-consuming and inefficient process.

The present disclosure relates to, among other things, a method of automatically classifying documents. By automatically classifying documents according to one or more embodiments of the present disclosure, recursive review of documents and/or reassessment of the context around search hits may be reduced such that the review and classification of the documents is more efficient. In some embodiments, a computing system may be configured to obtain, parse through, and identify documents that correspond to a particular search term. In these and other embodiments, the computing system may be configured to generate a context object regarding how the particular search term relates to the identified documents based on one or more words, symbols, or phrases adjacent to or in the proximity of the particular search term in the identified documents. The computing system may be configured to group the (potentially thousands or millions) of contexts into discrete groups based on similarities between the contexts. Depending on the processing power, the computing system may be configured to group the large number of contexts in a relative short amount of time as compared to previous processes performed by human. The computing system may be configured to automatically apply classifications to various documents based on the discrete groups of contexts. Thus, a computing system configured to operate according to the present disclosure may not only classify documents more efficiently than human users, but also in a way that is unconventional for human users.

Reference will now be made in detail to the various example embodiments of the disclosed subject matter, example embodiments of which are illustrated in the accompanying drawings. The structure and corresponding method of operation of the disclosed subject matter will be described in conjunction with the detailed description of the system.

The disclosed subject matter may be employed to identify potentially privileged communications or information in one or more documents. FIG. 1A illustrates an example method 100 for identifying potentially privileged information in documents. The method 100 may be arranged in accordance with at least one embodiment described in the present disclosure. In these and other embodiments, the method 100 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 100 may begin at block 102, where a set of documents may be obtained from one or more data storages. The set of documents may include documents collected from one or more custodians or documents collected from a communication system (such as an e-mail system). The documents may also include metadata, such as information on the sender, recipient(s), time, subject, and date of transmission, and other metadata for the documents for communications.

At block 104, a search term object may be generated based on a search term relating to text included in one or more documents included in the set of documents. For example, search terms that may indicate potentially privileged information in the documents may be identified. The search terms could include terms such as "legal", "lawyer", or "settlement", which may indicate the presence of potentially privileged communications. The method may employ a number of search terms to analyze the document for potentially privileged information. The search terms may be identified in advanced through institutional knowledge of the documents or may include a predetermined list of search terms that are common in privileged communications. Additionally or alternatively, the search terms may be identified through an algorithm analyzing the documents for key words that appear in documents identified as privileged. In some embodiments, a computing system may generate a search term object that corresponds to the identified search terms.

For each search term object, the disclosed subject matter may identify each instance the search term object appears in the documents. Each individual instance where a search term object appears in the documents may be referred to as a mention of the search term object. Therefore, the term "legal" may appear twenty times in the documents, in which case there are twenty mentions of the term "legal" in the documents. There may be more than one mention of the same search term object in a single document.

At block 106, text objects may be extracted from each of the documents. In some embodiments, the computing system may generate a text object corresponding to each word, numerical symbol, phrase, and/or any other symbols included in a particular document. For example, a sentence such as "I spoke with legal." in a particular document may be used to generate five text objects: "I", "spoke", "with", "legal", and ".".

At block 108, a text object database may be generated based on the extracted text objects. The text object database may include each of the extracted text objects from all or some of the documents included in the set of documents. Because the extracted text objects may be generated from a variety of different documents, the text object database may include an indication of the document from which the text objects are extracted. In some embodiments, text objects that do not affect the meaning of a phrase or statement in the particular document may be omitted from the text object database. Returning to the previous example, the text object "." from the sentence "I spoke with legal." may be omitted from the text object database.

At block 110, the search term object may be compared to each of the text objects included in the text object database to identify one or more relevant text objects from the text object database that match the search term object.

At block 112, a context object may be generated for each of the relevant text objects. In some embodiments, a context may be identified for each mention of the search term object in the documents in which the context is a set of words surrounding a particular search term. In these and other embodiments, the context could be defined as the set of words comprising the term itself, a number of words preceding the term, and a number of words following the term. For example, the context can be defined by N-words, which includes N number of words before the search term and N number of words after the search term. Additionally or alternatively, the context could be defined as the sentence, paragraph, excerpt, or section of the document in which the particular terms appears. Each of the words, numbers, phrases, and/or any other symbols included in the context may be used to generate a corresponding text object, and the context object may include all of the text objects associated with the context. Additionally or alternatively, the context may be used to generate the context object without dividing out any words or phrases from the context.

In some embodiments, a particular search term may have multiple contexts because the particular search term may appear in the documents more than once. For example, the term "legal" may appear in the documents fifty times. As a result, there may be fifty relevant text objects or a relevant text object with an indication of the fifty mentions of the term "legal." Each mention of the term may have its own context. Accordingly, the term may have fifty contexts in the documents. As an example, in these embodiments, there may be a context object associated with each relevant text object or indication of the term "legal" in a relevant text object. A particular search term may also appear more than once in a single document, in which case the search term could have multiple contexts within the same document.

At block 114, a grouping method may be applied to the context objects to group the context objects into two or more groups. In some embodiments, the grouping method may be performed based on similarities between the context objects. For example, the search term "legal" may have the following two contexts: "I talked with our legal department" and "I talked to our legal team". These two contexts may be grouped together because of the similarities in the verbiage between the contexts. Another context with the search term "legal" is: "Jaywalking is not legal". This context is different in verbiage from the previous two contexts and may be grouped into a different context. Various methods may be used to group the context objects based on similarities between the context objects, including without limitation: clustering algorithms, grouping by common phrases, and grouping by file attributes.

In these and other embodiments, the grouping method may include applying a point to each context object within a vector space based on the usage corresponding to each of the context objects and grouping the context objects based on a proximity of the context objects in the vector space as determined by the grouping method. These and other vector comparison approaches may facilitate quantitatively comparing the similarities between one or more context objects.

As such, the context objects may be converted into a vector space prior to grouping the context objects based on similarities using the methods above. In some embodiments, the context objects may be converted into word embeddings. The word embeddings may be mapped to vectors and the vectors may be used to generate a vector space. The vector space may have multiple dimensions and may comprise a high dimensional space. Various methods could be used to map the word embeddings into a vector space in high dimensional space. In one embodiment, the training process Word-to-Vector can be used to process the contexts and produce a multi-dimension vector for each context (as described in U.S. Pat. No. 9,037,464 to Mikolov et al., hereby incorporated by reference). Other suitable methods for producing a vector space for the contexts may also be used in alternative embodiments, such as: Global Vectors (i.e., GloVe); Graphical Models; Latent Semantic Analysis; Bidirectional Encoder Representations from Transformers (BERT); or Bag-of-Words. The conversion of the contexts to a vector space using these methods may produce a numeric representation of each context in a high-dimensional space.

In these and other embodiments, grouping could be performed by employing a clustering algorithm. Using a clustering algorithm, each context objects is assigned a point within a vector space. The points in the vector space that are close to each other are grouped together such that a group contains points that are in proximity to each other. The disclosed subject matter may employ various different clustering algorithms to produce clusters, including without limitation: k-Means Clustering; DBSCAN; Agglomerative Clustering; or Gaussian Mixture Models (GMM).

The number of groups used for the clustering algorithm may be adjusted depending on the number of contexts identified. For example, if there are less than one hundred context objects for a search term, then fewer groups could be used for clustering. In one embodiment, less than five cluster groups could be used when there are less than one hundred contexts. As another example, if there are more than two hundred contexts for a search term, then more groups could be used for clustering. In an embodiment, more than fifteen clusters could be used when there are more than two hundred contexts.

In another embodiment, grouping could also be performed by phrase detection, where contexts that share certain common phrases are grouped together. In this method, common phrases within the context objects of each search term are identified. Then those common phrases are used to group context objects together. In various embodiments, the common phrases identified and used in this method may be exclusive or inclusive of the search term itself. Various phrase detection algorithms could be used to identify the common phrases in the context objects.

Figure 2:
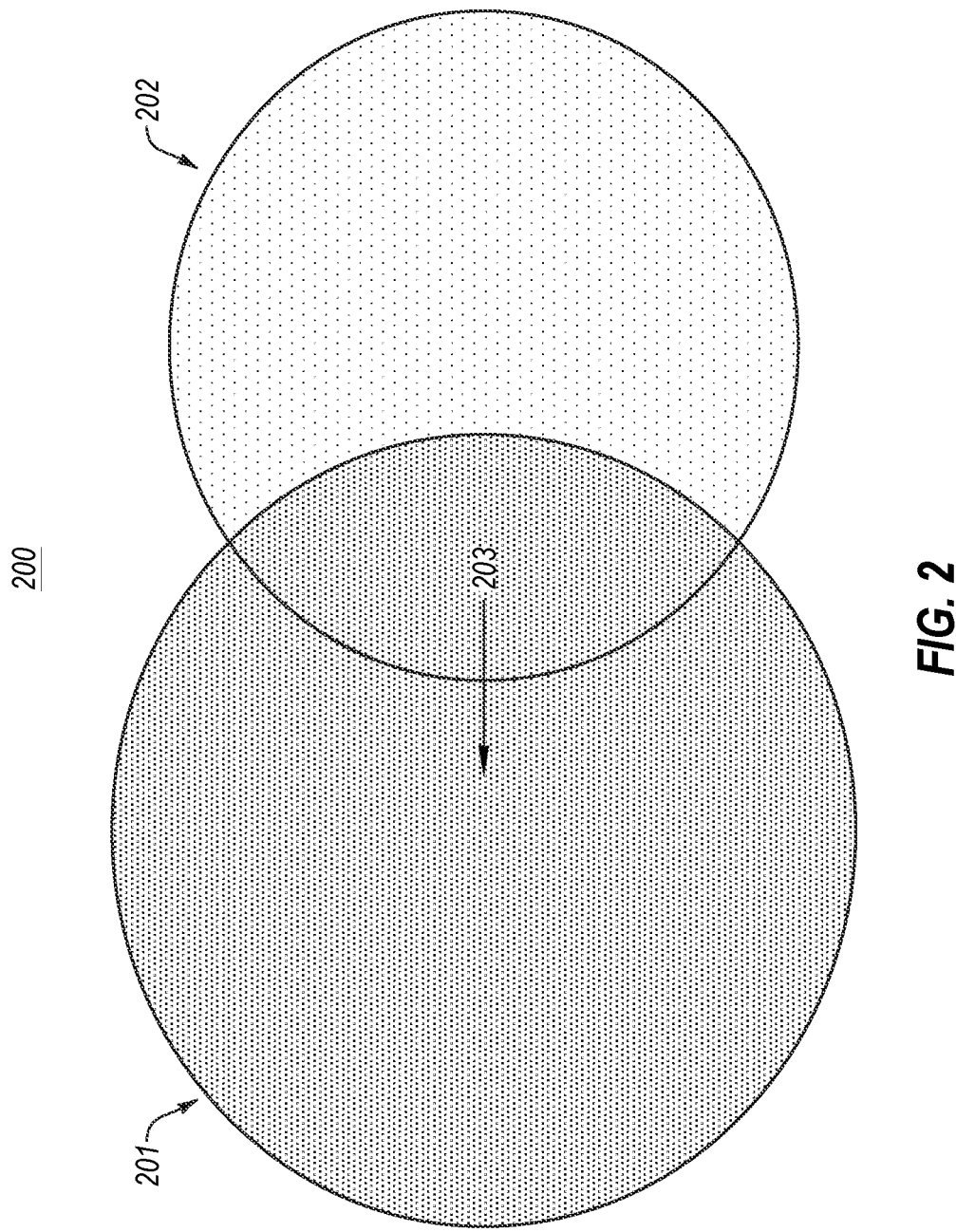
FIG. 2 illustrates a sample grouping of common phrases and an example method for resolving overlapping phrases in groups.

As an example, the common phrases identified could include: "legal disclaimer" or "legal department". To illustrate this example, assume there are thirty context objects that include the term "legal disclaimer", twenty context objects that include the term "legal department", and an overlap between the two groups such that five context objects include both terms. FIG. 2 shows the grouping of contexts which include these two example phrases. The contexts which include the phrase "legal disclaimer" could be grouped into Group 201. The contexts which include the phrase "legal department" could be grouped into Group 202. The area 203 shows the overlap between the two group where the contexts contain both the phrase "legal disclaimer" and "legal department". In an embodiment, contexts that contains two phrases may be included in the group that contains the larger number of context objects. In the example above, there are thirty context objects that include the term "legal disclaimer" in Group 201, twenty context objects that include the term "legal department" in group 202, and five context objects that include both terms in the area 203. The Group 201 is larger than the Group 202. In this example embodiment, the contexts in the area 203 would be included in the larger Group 1 for purposes of the grouping by common phrase.

In an alternative embodiment, grouping may also be performed by analyzing file attributes, such as the file type, the file author, or other metadata included with the documents. Grouping by file attributes is effective in instances where similar types of documents have similar contexts, or where documents created by the same person have similar contexts. For example, the accountant of a company may send out numerous financial statements which contain the term "legal expenses"; it may be helpful to group these documents together when analyzing them for potentially privileged content. Using this method, contexts may be group together based on file attributes such as the file extension of the document or the author metadata of the document. Alternatively, the contexts may be grouped together by both the file extension and the author of the document.

In accordance with another embodiment, the grouping of the context objects may also be performed by using a combination of grouping methods. Two or more of the methods described above can be combined to group the context objects to improve the similarity of the context objects within the groups. For example, a grouping method may combine both clustering, and common phrase detection. Another method may combine clustering, common phrase detection, and file attributes to group similar context objects.

At block 116, one of a first classification and a second classification may be applied to each of the context objects. In these and other embodiments, application of the first classification or the second classification to each of the context objects may occur before or after grouping the context objects as described at block 114. Application of the first and second classifications to the context objects may be based on analyzing the relevant text objects associated with the context objects with respect to one or more criteria determined based on the obtained set of documents. The criteria for classifying the context objects may be described in further detail below in relation to FIG. 1B.

In some embodiments, the context objects may be further clustered according to one or more clustering criteria at varying hierarchies. For example, a particular set of context objects may be grouped according to the file type associated with each context object included in the particular set of context objects such that the particular set of context objects is divided into three clusters (e.g., PDFs, embeddings, and spreadsheets). In this example, each of the context objects included in the particular set of context objects may also be given a first classification and a second classification such that the context objects to which the first classification is applied may be grouped as a particular first cluster, and the context objects that are assigned the second classification may be grouped as a particular second cluster. The particular first cluster and the particular second cluster may be subclusters, while the three clusters relating to the file types in which the context objects were located may be primary clusters. In other words, the particular set of context objects may be clustered at two levels: a first level corresponding to the file types associated with the context objects and a second level corresponding to the classifications of the context objects.

A particular embodiment of the classification of the context objects may include classifying each group of context objects as either potentially privileged or not privileged. The classification may include analyzing a set of context objects within a group and labelling each context object in the set as either potentially privileged (i.e., the first classification) or not privileged (i.e., the second classification). The number of context objects selected for annotation within a group may vary and may depend on the number of context objects within the group. A group with a large number of context objects may have a larger set of context objects for classification, whereas a group with a smaller number of context objects may have fewer context objects for classification. During the classification, each context object in the set is analyzed and each context object is classified as potentially-privileged or not-privileged label. The classification process is performed for each group of context objects, whereby a select set of context objects in each group is classified.

In some embodiments, application of the first classification and the second classification to the context objects may be facilitated by a machine learning model. The machine learning model may be trained based on the set of documents or a different training set of documents in which one of the first classification or the second classification is applied, such as by a trainer user, to each document used to train the machine learning model. The machine learning model may be configured to assign the first classification or the second classification to documents and/or context objects that have previously not been introduced to the machine learning model based on patterns, heuristics, rules, or any other characteristics learned during the training process. In other words, the machine learning model may be configured to identify and generate one or more of the criteria used to apply the first classification or the second classification to documents and/or context objects.

At block 118, one of the first classification and the second classification may be applied to each group of context objects based on the classifications of the context objects within each of the groups. Returning to the previous example, the classifications for each group are analyzed and a determination is made whether the group as a whole should be labelled potentially privileged or not privileged based on the annotations. The groups may be labelled categorically so that all the contexts in a group are labelled either potentially privileged or not privilege. If the classifications in the group contain many potentially privileged annotations, then the group may be labelled as potentially privileged. However, if the group contains few or no potentially privileged annotations, then the group may be labelled as not privileged. The threshold for how many potentially privileged annotations in a group are necessary to label the group potentially privileged may be adjusted based on various factors. These factors may include, without limitation, the number of context objects in the group, institutional knowledge regarding the analysis, the attributes of the context objects or the documents, or the nature of the privilege review. In instances where privileged information is highly sensitive, a single potentially privileged classification of a context object in a group may be sufficient to label the group potentially privileged.

At block 120, the first classification and the second classification may be automatically applied to each document of the set of documents. For example, the second classification may be applied to one of the documents in response to a relevant text object of the one of the documents being associated with a context object that is part of a group that has the second classification applied thereto. Returning to the previous example, if a context object is in a group that has been labelled potentially privileged, then the document may also be labelled potentially privileged. For a document with multiple context objects, if a single context object associated with the document is in a group that has been labelled potentially privileged, then the document may be labelled potentially privileged as well. For a document with multiple context objects, a document may be labelled not privileged if every context objects associated with the document is in a group that has been labelled not privileged.

Modifications, additions, or omissions may be made to the method 100 without departing from the scope of the disclosure. For example, the designations of different elements in the manner described is meant to help explain concept objects described herein and is not limiting. Further, the method 100 may include any number of other elements or may be implemented within other systems or contexts than those described.

Figure 1B:
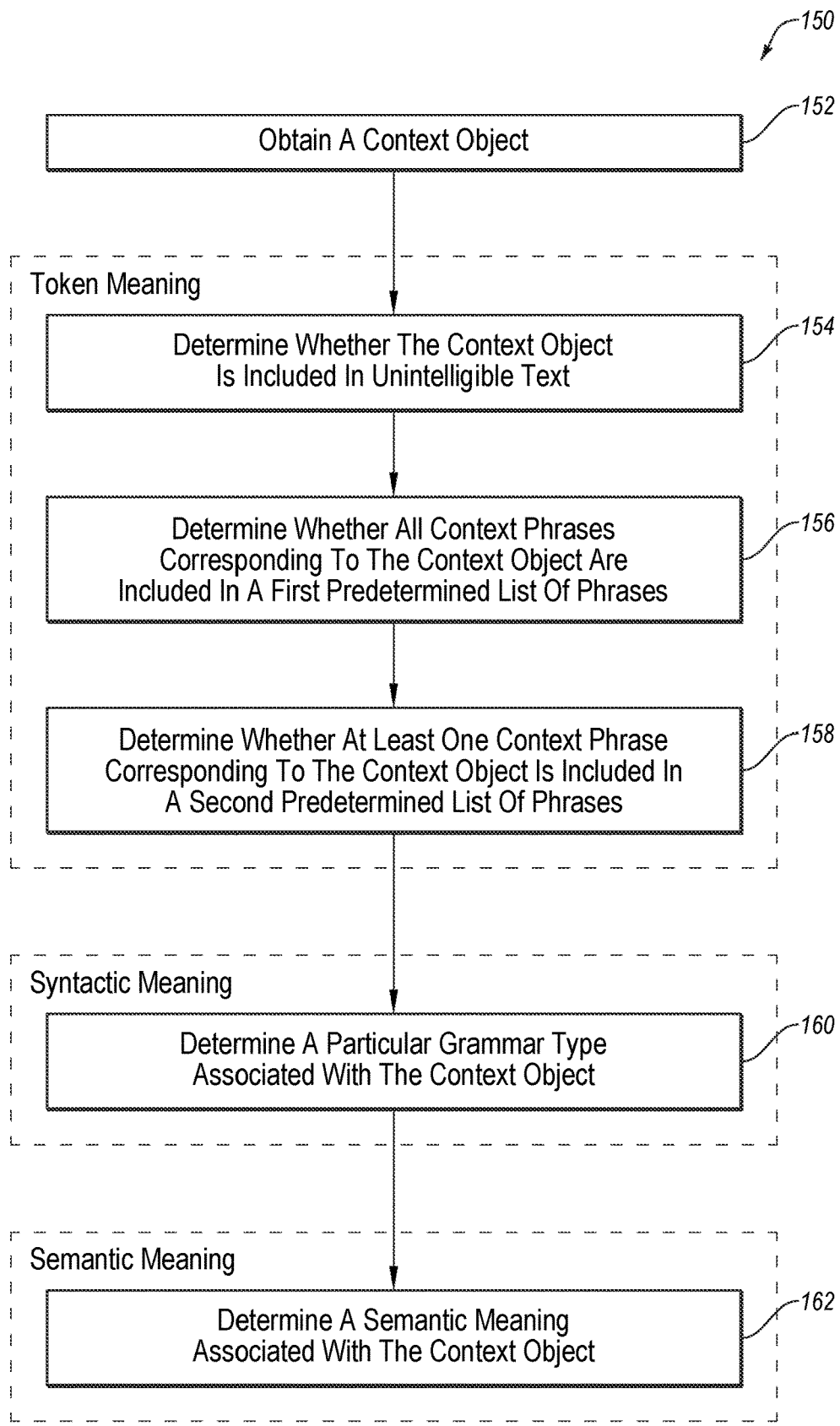
FIG. 1B illustrates an example method of applying a first classification or a second classification to context objects according to various criteria.

FIG. 1B illustrates an example method 150 of applying a first classification or a second classification to context objects according to various criteria. The method 150 may be arranged in accordance with at least one embodiment described in the present disclosure. In these and other embodiments, the method 150 may be performed based on the execution of instructions stored on one or more non-transitory computer-readable media. Although illustrated as discrete blocks, various blocks may be divided into additional blocks, combined into fewer blocks, performed in a different order of operations, or eliminated, depending on the desired implementation.

The method 150 may begin at block 152, where a context object is obtained. In some embodiments, the method 150 beginning at block 152 may include any of the context objects determined for the relevant text objects at block 112 of the method 100. In these and other embodiments, the operations associated with the method 150 may be performed as part of applying the first classification or the second classification to each of the context objects corresponding to the operations at block 116 of the method 100.

At block 154, whether the context object is included in unintelligible text may be determined. In some embodiments, the context object being included in unintelligible text may be determined according to whether the context object is included in text that is nonsensical or difficult to understand for human readers. In these and other embodiments, a file type(s) of the document(s) to which the context object corresponds may be identified. Responsive to identifying that the file type is a file type that often includes text objects including unintelligible text, it may be determined whether the context object or any adjacent text objects are likely to include unintelligible text. If the context object is obtained from unintelligible text, the context object may be assigned a first classification. For example, a particular context object may be obtained from a table or a universal resource locator (URL), and the particular context object may be given a particular first classification. In this example, the particular first classification may be marking the context object as a non-privileged context object, which may be indicative of a corresponding document being potentially non-privileged. Additionally or alternatively, the context object may be identified as being included in unintelligible text even when the file type(s) of the document(s) to which the context object corresponds are unstructured documents (e.g., MICROSOFT Word documents, PDF files, etc.).

At block 156, it may be determined whether all context phrases corresponding to the context object are included in a first list of phrases. The first list of phrases may be generated, such as by a computing system, and the first list of phrases may include various sequences of text objects that correlate to information that tends to be assigned to the first classification (e.g., tends to be related to non-privileged information if the first classification is a category for non-privileged information). For example, a particular first list of phrases may include bigrams that include two text objects in sequence, trigrams that include three text objects in sequence, etc. In these and other embodiments, the context object may be partitioned into multiple sequences of text tokens in which the size of the sequences of text tokens correspond to the size of the context phrases. For example, comparing a particular context object to a particular first predetermined list of phrases that includes bigrams may include partitioning the particular context object into various two-text-token sequences. The text-token sequences corresponding to the context object may be compared with the context phrases included in the first list of phrases, and responsive to determining that all of the text-token sequences of the context object are included in the first list of phrases, the context object may be assigned the first classification.

At block 158, it may be determined whether at least one context phrase corresponding to the context object are included in a second list of phrases. In some embodiments, the second list of phrases may include context phrases that tend to relate to the second classification (e.g., tends to be related to potentially privileged information if the second classification is a category for potentially privileged information). The text-token sequences corresponding to the context object may be compared with the context phrases included in the second list of phrases, and responsive to determining that at least one of the text-token sequences of the context object are included in the second list of phrases, the context object may be assigned the second classification.

At block 160, a particular grammar type associated with the search term associated with the context object may be determined. In some embodiments, the search term associated with the context object may be compared to various natural language grammatical rules in which the natural language grammatical rules include conditional statements relating to the search term. For example, a particular natural language grammatical rule may compare the search term to a particular sequence of text objects, and responsive to the search term including the particular sequence of text objects, the search term may be assigned a particular grammar type (e.g., a noun, a verb, an adjective, etc.). Additionally or alternatively, the search term may be analyzed based on a dependency tree that maps relationships between one or more words. The dependency tree may include various words that are related to a particular search term, other words related to the particular search term, or words related to a particular context associated with the particular search term. As such, the context object associated with the particular search term may be related to the words included in the dependency tree. In these and other embodiments, the first classification or the second classification may be applied to the context object according to the particular grammar type assigned to the context object and any dependencies associated with a corresponding search term, which may be associated with one or more contexts included in a particular dependency tree.

At block 162, a semantic meaning associated with each of the context objects may be determined. In some embodiments, the semantic meaning may be determined hierarchically based on the token-level analysis and the syntactic-level analysis of the context object. For example, the word "love" in the phrase "I love you" may be identified at the syntactic level as being a verb at a first level, while the words "I" and "you" are identified as tokens that are dependent on or modified by the first-level word, "love." In this example, the semantic meaning determined for the phrase "I love you" may be that the words "I" and "you" are associated with each other by the word "love", and a corresponding meaning for the phrase may be established based on this understanding.

In these and other embodiments, a machine learning model may be configured to assign classifications to the context objects. The machine learning model may be trained to identify and analyze the context objects at various levels or via various methods of understanding. In some embodiments, the machine learning model may be trained to analyze the context objects at a token level. At the token level, the machine learning model may be trained to classify context objects according to text tokens and n-grams (e.g., bigrams, trigrams, etc.), which may be the same as or similar to the operations described in blocks 154, 156, and 158. Additionally or alternatively, the machine learning model may be trained to analyze the context objects at a syntactical level. At the syntactical level, the machine learning model may be trained to provide classifications for the context object according to grammatical structures corresponding to the context object, which may be the same as or similar to the operations described in block 160.

Additionally or alternatively, the machine learning model may analyze a semantic meaning associated with the context object and classify the context object based on the semantic meaning, which may be the same or similar to the operations described in block 162. For example, a particular machine learning model configured to classify context objects at a semantic level may be trained using a token database that includes phrases frequently used in contractual language (e.g., boilerplate language in contracts) and a syntactic database that includes various grammatical rules. In this example, the particular machine learning model may be trained to compare a particular context object to phrases included in the semantic database and/or generate new phrases based on the token database to which the context objects may be compared to establish a token-level meaning of the context objects. The machine learning model may apply one or more grammatical rules from the syntactic database to establish a syntactic-level meaning of the particular context object. Based on the token-level and syntactic-level meanings of the particular context object, the machine learning model may determine a semantic meaning of the particular context object such that the machine learning model may provide an appropriate classification for the particular context object, such as classifying the particular context object as boilerplate contractual language.

In some embodiments, a particular context object may not satisfy any of the criteria described in relation to the operations of the method 150 at blocks 152-162. In these and other embodiments, the particular context object may be assigned an unknown classification rather than the first classification or the second classification. Additionally or alternatively, the particular context object may be assigned to the first classification or the second classification by default if the particular context object does not satisfy any of the criteria described in relation to the method 150.

Modifications, additions, or omissions may be made to the method 150 without departing from the scope of the disclosure. For example, the designations of different elements in the manner described is meant to help explain concepts described herein and is not limiting. Further, the method 150 may include any number of other elements or may be implemented within other systems or contexts than those described.

Figure 3A:
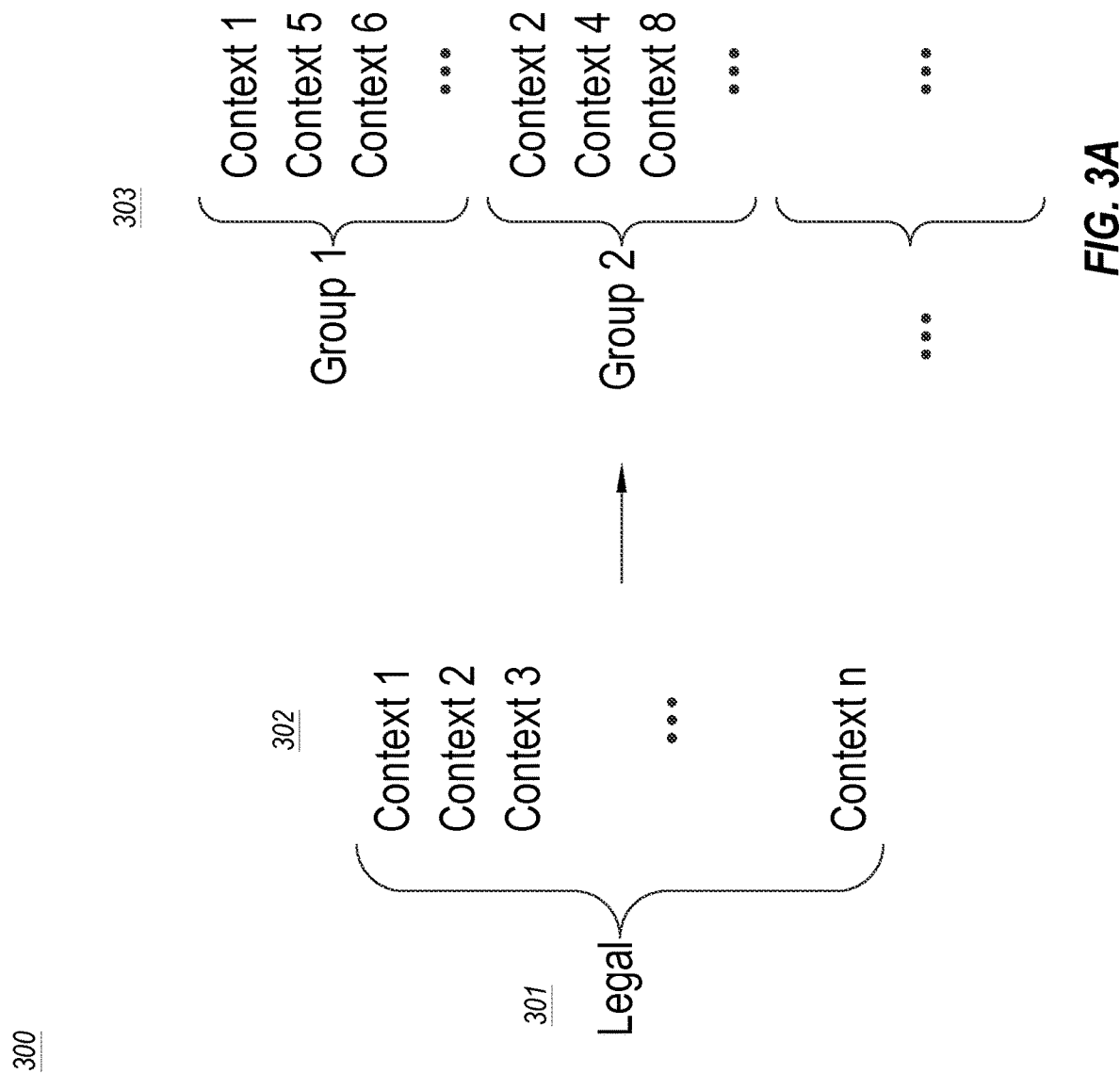
FIGS. 3-A to 3-C illustrate an example workflow for identifying, analyzing contexts, and classifying documents.
Figure 3B:
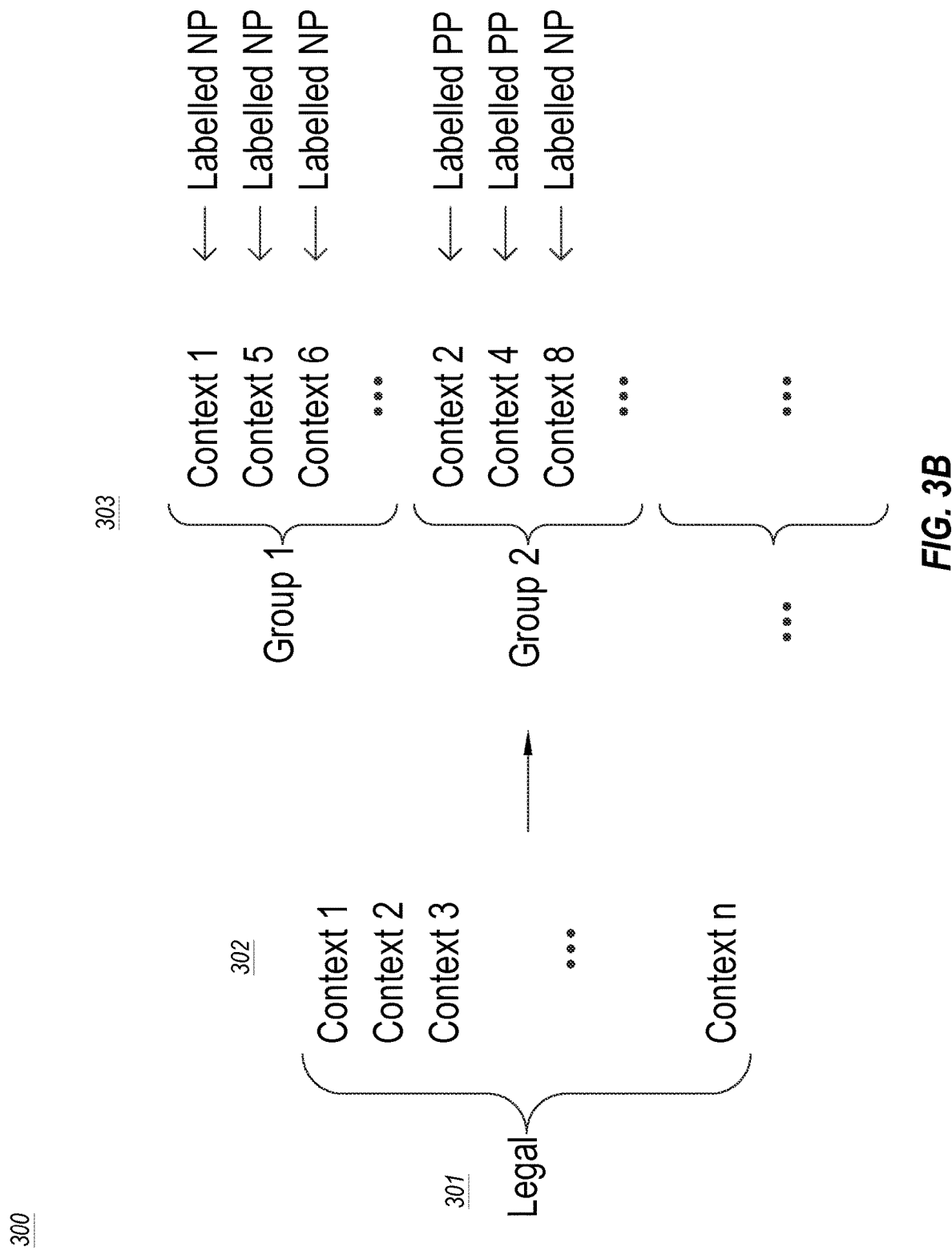
Figure 3C:
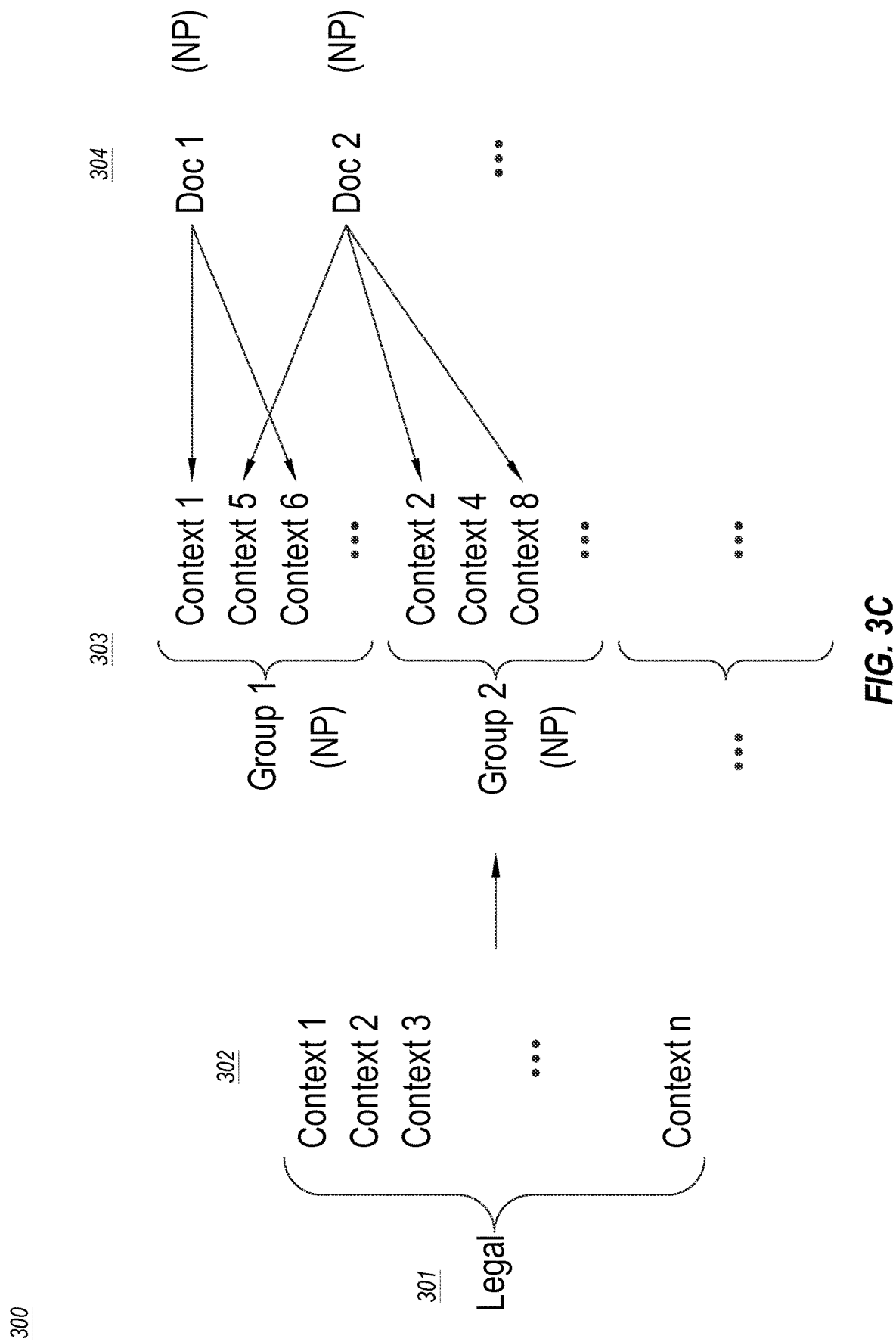

FIGS. 3-A to 3-C illustrates an example workflow for the disclosed subject matter wherein documents are labelled potentially privileged or not privileged. In FIG. 3-A, the example search term "legal" has been identified in the documents at step 301. While multiple search terms may be identified in the documents, for purposes of this example only a single search term may be shown in the workflow. The search term is used to identify contexts where the search term is mentioned in the documents. At step 302, the example method has identified n contexts in the documents where the search term is mentioned (i.e. a "mention" of the search term). A list of contexts containing the search term "legal" is shown, which are labelled context 1, context 2, . . . down to context n.

At step 303, the n contexts are then organized into groups base on similar contexts using a grouping algorithm. As discussed above, the method used for grouping the contexts may include, without limitation: clustering algorithms, grouping by common phrases, and grouping by file attributes. In the example workflow in FIG. 3-A, the contexts have been grouped together in multiple groups, which are sequentially labelled Group 1, Group 2, etc. Each group contains a number of similar contexts. In this example, Group 1 contains context 1, context 5, context 6, and potentially other contexts that are not shown in the figure. And Group 2 contains context 2, context 4, context 8, and potentially other contexts that are not shown in the figure.

Once the contexts have been grouped, a number of the contexts in each group may be selected to be annotated as potentially privileged or not privileged. In FIG. 3-B, three contexts from each group have been selected and may be annotated at step 303. For Group 1, the three contexts selected for annotation (i.e., contexts 1, 5, and 6) have been annotated as not privileged. In this instance, Group 1 may also be labelled as not privileged because all the contexts selected for annotation have been annotated as not privileged. For Group 2, two contexts have been annotated as potentially privileged (contexts 2 and 4) and one as not privileged (context 8). In this instance, Group 2 may be labelled as potentially privileged because multiple contexts selected for annotation have been annotated as potentially privileged.

In FIG. 3-C, the annotation of contexts has been completed, and the groups have been labelled. As explained above, Group 1 has been labelled as not privileged (NP) and Group 2 has been labelled as potentially privileged (PP) as shown in step 303. At step 304, the contexts for the search term "legal" in each of the documents is analyzed. To illustrate this example workflow, assume that Document 1 contains two mentions of the term "legal", whereas Document 2 contains three mentions. Each mention of the term "legal" in the documents may also have a context. Accordingly, Document 1 contains two contexts (which are contexts 1 and 6 for purposes of this example) and Document 2 contains three contexts (which are contexts 2, 5, and 8 for purposes of this example).

As show in step 304 in FIG. 3-C, both the contexts in Document 1 were grouped in Group 1. The arrows at step 304 indicate that contexts 1 and 6 were both grouped into Group 1, which was labelled not privileged during step 303. Because all the contexts identified in Document 1 are in groups that have been labeled not privileged, Document 1 may also be labelled not privileged. In this example, all the contexts in Document 1 were grouped in the single group, but in the event the contexts in Document 1 were grouped in different groups, all the groups would need to be labelled not privileged in order for Document 1 to also be labelled not privileged.

In FIG. 3-C, Document 2 contains three mentions of the search term "legal" and three corresponding contexts (contexts 2, 5, and 8). Context 5 has been grouped in Group 1, which was labelled not privileged. And contexts 2 and 8 have been grouped in Group 2, which was labelled potentially privileged. Because at least one context identified in Documents 2 is in a group that has been labelled potentially privileged, Document 2 may also be labelled potentially privileged. In this example, two contexts relating to Document 2 were group in a potentially privileged group (context 2 and context 8), but Document 2 would be labelled potentially privileged even if only one context was included in a potentially privileged group (e.g., only context 2 or only context 8).

Figure 4:
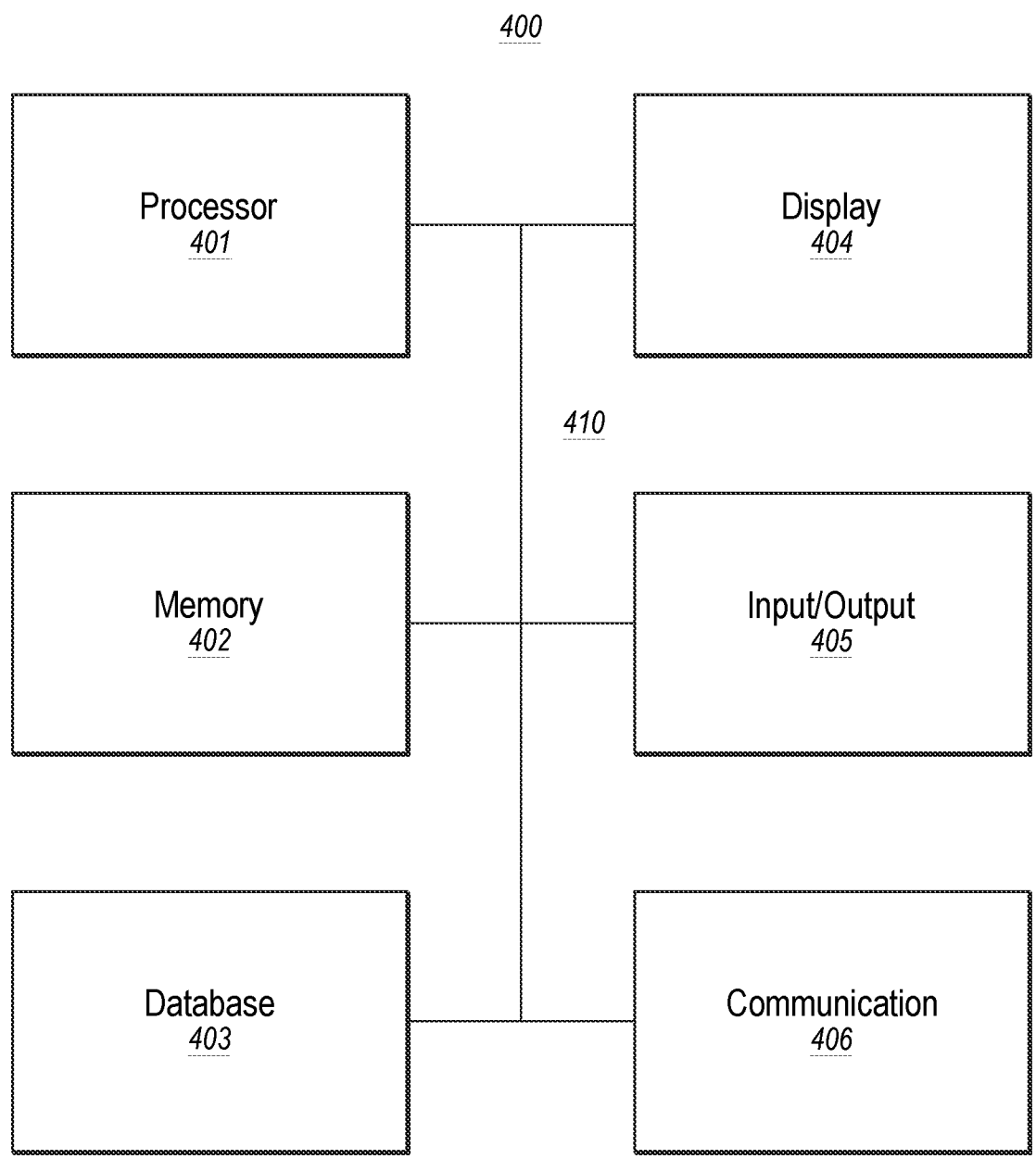
FIG. 4 depicts a block diagram illustrating an example computing system for execution of the operations comprising various embodiments of the disclosure.

FIG. 4 shows a system architecture adapted to support one embodiment of a system to classify documents. FIG. 4 depicts a diagram illustrating an example computing system 400 for execution of the operations comprising various embodiments of the disclosure. As shown, the system 400 for implementing the subject matter disclosed herein includes a processing unit 401, memory 402, storage 403, display adapter 404, data input/output module 405, communication interface 406, and a bus 410 that couples elements 401-406.

The bus 410 may comprise any type of bus architecture. Examples include a memory bus, a peripheral bus, a local bus, etc. The processing unit 401 is an instruction execution machine, apparatus, or device and may comprise a microprocessor, a digital signal processor, a graphics processing unit, an application specific integrated circuit (ASIC), a field programmable gate array (FPGA), etc. The processing unit 401 may be configured to execute program instructions stored in memory 402 and/or storage 403 and/or received via data I/O module 405.

The memory 402 may include read only memory (ROM) and random access memory (RAM). Memory 402 may be configured to store program instructions and data during operation of system 400. In various embodiments, memory 402 may include any of a variety of memory technologies such as static random access memory (SRAM) or dynamic RAM (DRAM), including variants such as dual data rate synchronous DRAM (DDR SDRAIVI), error correcting code synchronous DRAM (ECC SDRAIVI), or RAMBUS DRAM (RDRAM), for example. Memory 402 may also include nonvolatile memory technologies such as nonvolatile flash RAM (NVRAM) or ROM. In some embodiments, it is contemplated that memory 402 may include a combination of technologies such as the foregoing, as well as other technologies not specifically mentioned. When the subject matter is implemented in a computer system, a basic input/output system (BIOS), containing the basic routines that help to transfer information between elements within the computer system, such as during start-up, may be stored in ROM.

The database/storage 403 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk or other optical media. The drives and their associated computer-readable media provide nonvolatile storage of computer readable instructions, data structures, program modules and other data for the system 400.

It is noted that the methods described herein can be embodied in executable instructions stored in a computer readable medium for use by or in connection with an instruction execution machine, apparatus, or device, such as a computer-based or processor-containing machine, apparatus, or device. It may be appreciated by those skilled in the art that for some embodiments, other types of computer readable media may be used which can store data that is accessible by a computer, such as magnetic cassettes, flash memory cards, digital video disks, RAM, ROM, and the like may also be used in the example operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional example computer readable medium includes: a portable computer diskette; a RAM; a ROM; an erasable programmable read only memory (EPROM or flash memory); optical storage devices; and the like.

A number of program modules may be stored in memory 402, including an operating system, one or more applications programs, program data, and other program modules. A user may enter commands and information into the system 400 through data I/O module 405. Data I/O module 405 may include mechanisms such as a keyboard, a touch screen, a pointing device, etc. Other external input devices (not shown) may be connected to the system via data I/O module 405. In some embodiments, external input devices may include video or audio input devices such as a video camera, a still camera, etc. Data I/O module 405 may be configured to receive input from one or more users of system 400 and to deliver such input to processing unit 401 and/or memory 402 via bus 410.

A display adapter 404 may also be connected to the bus 410. Display adapter 404 may be configured to display output of system 400 to one or more users. In some embodiments, a given device such as a touch screen, for example, may function as both data entry module and display. Other peripheral output devices, not shown, such as speakers and printers, may be connected to the system 400.

The system 400 may operate in a networked environment using logical connections to one or more remote nodes (not shown) via communication interface 406. The remote node may be another computer, a server, a router, a peer device or other common network node, and typically includes many or all of the elements described above relative to the system 400. The communication interface 406 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 406 may include logic configured to support direct memory access (DMA) transfers between memory 402 and other devices.

In a networked environment, program modules depicted relative to the system 400, or portions thereof, may be stored in a remote storage device, such as, for example, on a server. It will be appreciated that other hardware and/or software to establish a communications link between the system 400 and other devices may be used.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

The illustrated and described method elements are not necessarily strictly independent or unitary method steps. One or more of the illustrated elements (steps) may be combined with one or more of the other elements. Likewise, one or more of the illustrated method elements may be separated into one or more constituent sub-elements or sub-steps. These steps and sub-steps may be performed by the same or different hardware components and software processes, such as those shown in FIG. 4. At least one component defined by the claims may be implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Example embodiments of the disclosed subject matter have been disclosed in an illustrative style. Accordingly, the terminology employed throughout should be read in an example rather than a limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that scope shall not be restricted, except in light of the appended claims and their equivalents.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of automatically classifying documents, comprising:
    obtaining, by a system that includes a processor and memory, a set of documents from one or more document data storages;
    obtaining, by the system, a first classification for first documents of the set of documents and a second classification for second documents of the set of documents;
    generating, by the system, a search term object based on a search term relating to text included in one or more documents included in the set of documents;
    extracting, by the system, text objects from each of the documents included in the set of documents in which each of the text objects is at least one of: a word, a phrase, or a numerical symbol included in each of the documents included in the set of documents;
    generating, by the system, a text object database that includes the text objects extracted from the documents, the text objects each including an indication of the document from which the text objects are extracted;
    comparing, by the system, each of the text objects from the text object database to the search term object to identify one or more relevant text objects, the relevant text objects matching the search term object;
    determining, by the system, a context object for each of the relevant text objects, the context objects indicating a usage of the relevant text objects within the documents corresponding to the relevant text objects and a context object for one of the relevant text objects determined based on accessing and analyzing one or more text objects from the text object database that are located directly adjacent to the one of the relevant text objects in a document that includes the one of the relevant text objects;
    determining a vector space that includes a vector for each of the context objects, the vector for each of the context objects representing the relevant text objects and other text objects in the respective context object;
    grouping, by the system, the context objects into a plurality of groups based on a proximity of the vectors of the context objects in the vector space;
    classifying, by the system, each of the context objects, one of the context objects being classified based on analyzing the relevant text objects of the one of the context objects with respect to one or more criteria determined based on content of the obtained set of documents;
    after grouping the context objects into the plurality of groups and classifying each of the context objects, determining a number of context objects with the second classification in each of the plurality of groups of context objects;
    comparing, for each group, the number of context objects with the second classification to a context object number threshold, wherein the context object number threshold represents a particular number of context objects with the second classification;
    in response to the comparing, automatically classifying, by the system, with the second classification each context object in the groups that include a number of context objects with the second classification that satisfy the context object number threshold; and
    after classifying each context object in the groups that satisfy the context object number threshold, automatically applying, by the system, one of the first and second classifications to each document of the set of documents based on the classification of the context objects, the second classification applied to one of the documents in response to a context object corresponding to the one of the documents having the second classification.

2. The method of claim 1, wherein applying, by the system, one of the first and the second classifications to each of the context objects further comprises:
    obtaining, by the system, a training set of documents, wherein one of the first classification or the second classification is applied to each document included in the training set;
    training, by the system, a machine learning model to assign a document as the first classification or the second classification based on the application of the first classification and the second classification to the documents included in the training set; and
    applying, by the system and the trained machine learning model, the first classification or the second classification to each of the context objects.

3. The method of claim 1, wherein determining, by the system, the context object for each of the relevant text objects includes:
    identifying, by the system, a file type corresponding to the document from which the relevant text object was extracted; and
    responsive to identifying the file type is a file type that accommodates text objects in a table format, determining, by the system, whether one or more of the text objects adjacent to the relevant text object relate to a table format,
    wherein one or more of the criteria for applying, by the system, one of the first and the second classifications to each of the context objects includes determining whether the relevant text object is included in the table format.

4. The method of claim 1, wherein determining, by the system, the context object for each of the relevant text objects includes:
    comparing each of the context objects to a plurality of natural language grammatical rules, the plurality of natural language grammatical rules including conditional statements relating to the context objects; and
    assigning a particular grammar type to each of the context objects based on which of the conditional statements corresponding to the natural language grammatical rules are true,
    wherein one or more of the criteria for applying, by the system, one of the first and the second classifications to each of the context objects relates to the particular grammar type associated with each of the context objects.

5. The method of claim 1, wherein applying, by the system, one of first and second classifications to each of the context objects includes:
    obtaining, by the system, a plurality of phrases related to the first classification, each respective first phrase included in the plurality of phrases indicating a respective sequence including two text objects;
    identifying one or more context phrases for each of the context objects, each of the context phrases including a sequence of two text objects; and
    applying, by the system, the first classification to a particular context object responsive to determining that all of the context phrases corresponding to the particular context object are included in the plurality of phrases.

6. The method of claim 1, wherein applying, by the system, one of first and second classifications to each of the context objects includes:
    obtaining, by the system, a plurality of phrases related to the second classification, each respective phrase included in the plurality of phrases indicating a respective sequence including two text objects;
    identifying one or more context phrases for each of the context objects, each of the context phrases including a sequence of two text objects; and
    applying, by the system, the second classification to a particular context object responsive to determining that at least one of the context phrases corresponding to the particular context object is included in the plurality of phrases.

7. The method of claim 1, wherein one or more of the documents in the set of documents obtained from the one or more document data storages includes metadata, and the text objects extracted from each of the documents includes one or more text objects extracted from the metadata corresponding to the one or more documents.

8. One or more non-transitory computer-readable storage media configured to store instructions that, in response to being executed, cause a system to perform operations, the operations comprising:
    obtaining a set of documents from one or more document data storages;
    obtaining a first classification for first documents of the set of documents and a second classification for second documents of the set of documents;
    generating a search term object based on a search term relating to text included in one or more documents included in the set of documents;
    extracting text objects from each of the documents included in the set of documents in which each of the text objects is at least one of: a word, a phrase, or a numerical symbol included in each of the documents included in the set of documents;
    generating a text object database that includes the text objects extracted from the documents, the text objects each including an indication of the document from which the text objects are extracted;
    comparing each of the text objects from the text object database to the search term object to identify one or more relevant text objects, the relevant text objects matching the search term object;
    determining a context object for each of the relevant text objects, the context objects indicating a usage of the relevant text objects within the documents corresponding to the relevant text objects and a context object for one of the relevant text objects determined based on accessing and analyzing one or more text objects from the text object database that are located directly adjacent to the one of the relevant text objects in a document that includes the one of the relevant text objects;
    determining a vector space that includes a vector for each of the context objects, the vector for each of the context objects representing the relevant text objects and other text objects in the respective context object;
    grouping the context objects into a plurality of groups based on a proximity of the vectors of the context objects in the vector space;
    classifying each of the context objects, one of the context objects being classified based on analyzing the relevant text objects of the one of the context objects with respect to one or more criteria determined based on content of the obtained set of documents;
    after grouping the context objects into the plurality of groups and classifying each of the context objects, determining a number of context objects with the second classification in each of the plurality of groups of context objects;
    comparing, for each group, the number of context objects with the second classification to a context object number threshold, wherein the context object number threshold represents a particular number of context objects with the second classification;
    in response to the comparing, automatically classifying, by the system, with the second classification each context object in the groups that include a number of context objects with the second classification that satisfy the context object number threshold; and
    after classifying each context object in the groups that satisfy the context object number threshold, automatically applying, by the system, one of the first and second classifications to each document of the set of documents based on the classification of the context objects, the second classification applied to one of the documents in response to a context object corresponding to the one of the documents having the second classification.

9. The one or more non-transitory computer-readable storage media of claim 8, wherein applying one of the first and the second classifications to each of the context objects further comprises:
    obtaining a training set of documents, wherein one of the first classification or the second classification is applied to each document included in the training set;
    training a machine learning model to assign a document as the first classification or the second classification based on the application of the first classification and the second classification to the documents included in the training set; and applying the first classification or the second classification to each of the context objects based on the trained machine learning model.

10. The one or more non-transitory computer-readable storage media of claim 8, wherein determining the context object for each of the relevant text objects includes:
   identifying a file type corresponding to the document from which the relevant text object was extracted; and
   responsive to identifying the file type is a file type that accommodates text objects in a table format, determining whether one or more of the text objects adjacent to the relevant text object relate to a table format,
   wherein one or more of the criteria for applying one of the first and the second classifications to each of the context objects includes determining whether the relevant text object is included in the table format.

11. The one or more non-transitory computer-readable storage media of claim 8, wherein determining the context object for each of the relevant text objects includes:
   comparing each of the context objects to a plurality of natural language grammatical rules, the plurality of natural language grammatical rules including conditional statements relating to the context objects; and
   assigning a particular grammar type to each of the context objects based on which of the conditional statements corresponding to the natural language grammatical rules are true,
   wherein one or more of the criteria for applying one of the first and the second classifications to each of the context objects relates to the particular grammar type associated with each of the context objects.

12. The one or more non-transitory computer-readable storage media of claim 8, wherein applying one of first and second classifications to each of the context objects includes:
   generating a plurality of first phrases, each respective first phrase included in the plurality of first phrases indicating a respective sequence including two text objects;
   identifying one or more context phrases for each of the context objects, each of the context phrases including a sequence of two text objects; and
   applying the first classification to a particular context object responsive to determining that all of the context phrases corresponding to the particular context object are included in the plurality of first phrases.

13. The one or more non-transitory computer-readable storage media of claim 8, wherein applying, by the system, one of first and second classifications to each of the context objects includes:
   generating, by the system, a plurality of second phrases, each respective phrase included in the plurality of second phrases indicating a respective sequence including two text objects;
   identifying one or more context phrases for each of the context objects, each of the context phrases including a sequence of two text objects; and
   applying, by the system, the second classification to a particular context object responsive to determining that at least one of the context phrases corresponding to the particular context object is included in the plurality of second phrases.

14. The one or more non-transitory computer-readable storage media of claim 8, wherein one or more of the documents in the set of documents obtained from the one or more document data storages includes metadata, and the text objects extracted from each of the documents includes one or more text objects extracted from the metadata corresponding to the one or more documents.

15. A method of automatically classifying documents, comprising:
   obtaining a set of documents from one or more document data storages;
   obtaining a first classification for first documents of the set of documents and a second classification for second documents of the set of document;
   generating a search term object based on a search term relating to text included in one or more documents included in the set of documents;
   extracting text objects from each of the documents included in the set of documents in which each of the text objects is at least one of: a word, a phrase, or a numerical symbol included in each of the documents included in the set of documents;
   generating a text object database that includes the text objects extracted from the documents, the text objects each including an indication of the document from which the text objects are extracted;
   comparing each of the text objects from the text object database to the search term object to identify one or more relevant text objects, the relevant text objects matching the search term object;
   determining a context object for each of the relevant text objects, the context objects indicating a usage of the relevant text objects within the documents corresponding to the relevant text objects and a context object for one of the relevant text objects determined based on accessing and analyzing one or more text objects from the text object database that are located directly adjacent to the one of the relevant text objects in a document that includes the one of the relevant text objects;
   determining a vector space that includes a vector for each of the context objects, the vector for each of the context objects representing the relevant text objects and other text objects in the respective context object;
   grouping the context objects into a plurality of groups based on a proximity of the vectors of the context objects in the vector space;
   classifying each of the context objects, one of the context objects being classified based on analyzing the relevant text objects of the one of the context objects with respect to one or more criteria determined based on content of the obtained set of documents;
   after grouping the context objects into the plurality of groups and classifying each of the context objects, determining a number of context objects with the second classification in each of the plurality of groups of context objects;
   comparing, for each group, the number of context objects with the second classification to a context object number threshold, wherein the context object number threshold represents a particular number of context objects with the second classification;
   in response to the comparing, automatically classifying with the second classification each context object in the groups that include a number of context objects with the second classification that satisfy the context object number threshold; and
   after classifying each context object in the groups that satisfy the context object number threshold, automatically applying one of the first and second classifications to each document of the set of documents based on the classification of the context objects, the second classification applied to one of the documents in response to a context object corresponding to the one of the documents having the second classification.

16. The method of claim 15, wherein applying one of the first and the second classifications to each of the context objects further comprises:
obtaining a training set of documents, wherein one of the first classification or the second classification is applied to each document included in the training set;
training a machine learning model to assign a document as the first classification or the second classification based on the application of the first classification and the second classification to the documents included in the training set; and
applying the first classification or the second classification to each of the context objects based on the trained machine learning model.

17. The method of claim 15, wherein determining the context object for each of the relevant text objects includes:
identifying a file type corresponding to the document from which the relevant text object was extracted; and
responsive to identifying the file type is a file type that accommodates text objects in a table format, determining whether one or more of the text objects adjacent to the relevant text object relate to a table format,
wherein one or more of the criteria for applying one of the first and the second classifications to each of the context objects includes determining whether the relevant text object is included in the table format.

18. The method of claim 15, wherein determining the context object for each of the relevant text objects includes:
comparing each of the context objects to a plurality of natural language grammatical rules, the plurality of natural language grammatical rules including conditional statements relating to the context objects; and
assigning a particular grammar type to each of the context objects based on which of the conditional statements corresponding to the natural language grammatical rules are true,
wherein one or more of the criteria for applying one of the first and the second classifications to each of the context objects relates to the particular grammar type associated with each of the context objects.

19. The method of claim 15, wherein one or more of the documents in the set of documents obtained from the one or more document data storages includes metadata, and the text objects extracted from each of the documents includes one or more text objects extracted from the metadata corresponding to the one or more documents.

20. The method of claim 15, wherein grouping the context objects into the plurality of groups includes at least one of: a clustering algorithm, a common-phrase detection algorithm, or a file attributes analysis algorithm.

\* \* \* \* \*